Patented Oct. 24, 1939

2,177,412

UNITED STATES PATENT OFFICE 2,177,412

PROCESS FOR REDUCING METAL COMPOUNDS

Norman D. Scott, Sanborn, and Joseph Frederic Walker, Niagara Falls, N. Y., assignors to E. I. du Pont de Nemours & Company, Wilmington, Del., a corporation of Delaware No Drawing. Application January 31, 1938,
Serial No. 187,894

14 Claims. (Cl. 75—108)

This invention relates to the preparation of finely divided metals and more particularly to the reduction of metal compounds to form metals in extremely fine states of sub-division.

Finely divided metals have been made heretofore by a variety of methods both chemical and mechanical. Such finely divided metals or metal powders have utility for a variety of purposes, for example, as metal catalysts, pigments for paints, varnishes and inks and the like, as ingredients for chemical reactions in various processes and various other uses. For many uses of metal powders, the state of subdivision is an important factor and often the best results are given by the use of metal powders which have the finest state of sub-division. This is especially true of metal catalysts and metal powders used as chemical reagents, where an extremely large surface area per unit weight of metal is desired.

An object of the present invention is to provide an improved method for the production of finely divided metals. A further object is to provide an improved method for reducing metal compounds for the production of metal powders. Another object is to prepare powdered metals of extremely fine particle size, which have a high degree of chemical reactivity. A further object is to produce powdered metal catalysts having extremely large surface areas. Our invention also includes such metal powders as novel compositions of matter. Other objects will be apparent from the following description of our invention.

The above objects are accomplished in accordance with our invention by reacting a compound of a metal other than an alkali metal with a solution of an alkali metal addition compound of an organic compound. It is known that alkali metals will react with certain aromatic compounds, for example with polycyclic aromatic hydrocarbons such as naphthalene in the presence of various non-aqueous solvents to form colored solutions of what appear to be alkali metal addition compounds of the aromatic organic compounds. For example, sodium reacts with solutions of naphthalene in certain ether solvents to produce green colored solutions which appear to contain the sodium addition compound of naphthalene, having the empirical formula: $C_{10}H_8Na_2$. We have found that if a metal compound, for example, a metal halide, is added to such colored solutions of an alkali metal addition compound, the metal halide readily reacts with the colored solution to precipitate extremely finely divided metal and form the corresponding alkali metal halide. For example, a very finely divided form of nickel may thus be prepared by reacting anhydrous nickel chloride with the green solution of the sodium addition compound of naphthalene.

In this manner we have prepared very finely divided powders of various metals in a substantially pure state. We have found the particle size of our products to be exceedingly small as compared with the particle size of ordinary metal powders. In general, the maximum particle size of the product obtained by our method, may vary from 1 to 20 microns in diameter. In many of the metal powders we have prepared, the average particle size is not greater than about 1 to 4 microns in diameter. From microscopic observations, it appears that the particles larger than 4 microns in diameter are composed of smaller particles bound in loose aggregates.

We have further found that the metal powder made by our method generally has an extremely large surface area and an unusually high degree of chemical reactivity. The high degree of chemical reactivity is illustrated by the fact that the powders are usually more or less pyrophoric, often igniting spontaneously when exposed to the air at room temperature. Some of the less pyrophoric specimens merely became warm on exposure to the air, without igniting.

The microscopic observations show that the large surface area and consequent reactivity are due to the nature of the structure and surface of the individual particles. In comparison with certain purchased metal powders not made by our method it was found that the purchased powder, although of approximately the same particle size as our powders, did not have the pyrophoric or highly reactive nature of our powders. Comparison under the microscope showed that the individual particles of the purchased powders had a more or less smooth, lustrous surface, while the particles in our powders have a rough, irregular surface, and generally are darker in color and lack luster, typical of a substantially porous structure. For example a purchased nickel powder appeared as bright, lustrous particles under the microscope, whereas a nickel powder made by our process was black, non-lustrous and had an extremely irregular surface.

The metal powders produced by our herein described process also are characterized by having low apparent densities (weight per unit volume). In general, their apparent densities are from 0.3 to 0.5 gram per cc. The following data show the apparent specific gravities of nickel and cobalt powders prepared by our novel method:

| Metal | Apparent density |
| --- | --- |
|  | Grams per cc. |
| Nickel | 0.31 |
| Cobalt | 0.41 |

We attribute the exceedingly small particle size and reactive nature of our product to the nature of our process, wherein the reducing agent which effects reduction of the metal compound is in the form of a solution. The direct reduction of the metal compound by the solution apparently causes the formation of extremely small metal particles of submicroscopic size, which agglomerate to form the particles having irregular surfaces.

We are aware that heretofore it has been proposed to reduce metal compounds in non-aqueous solution by reacting a solution or suspension of the metal compound with a metal. For example, it is known that when a metal electronegative to copper is immersed in a non-aqueous solution of copper oleate, the metal surface will be copper plated (Gates, J. Phys. Chem. 15 97–146 (1911)). Similarly, it has been proposed to produce finely divided nickel by reacting a solution or suspension of a nickel halide in a non-aqueous solvent with powdered zinc (de Mahler, U. S. P. 1,997,135). In such processes, the resultant particle size of the product produced apparently depends in large measure upon the state of subdivision of the metal used as reducing agent. In order to obtain a satisfactory product by that method it is usually necessary that the reducing metal itself be in a finely divided condition and subsequently to separate the product from unreacted reducing metal, e. g., by a magnetic separation step. In our method, the reducing agent is not a metal but a metal compound in solution, which metal compound appears to be more reactive than the metal itself and more effective in producing an extremely finely divided product, because the reducing agent is present in substantially molecular dimensions.

The reducing agents utilized in the herein described invention are the alkali metal addition compounds of certain organic compounds. These addition compounds are formed by the reaction in which the organic compound adds on two atoms of sodium per molecule without disengaging hydrogen or any other element. This type of reaction is exemplified by the apparent reaction between sodium and naphthalene which empirically may be written:

$$C_{10}H_8 + 2Na \rightarrow C_{10}H_8Na_2$$

Alkali metal substitution compounds, that is, compounds which are formed by a reaction between alkali metal and an organic compound whereby the alkali metal replaces hydrogen or other element, for example, sodium alcoholate and the like, are not suitable for the purposes of the present invention. The organic compounds which are known to react with sodium or other alkali metals to form the addition compounds include the polycyclic aromatic hydrocarbons such as naphthalene, diphenyl, anthracene, acenaphthalene and the like and also aromatic carbonyl compounds in which there is no hydrogen atom attached to a carbon atom adjacent to the carbonyl group, such as anthraquinone; diaryl ketones, e. g., benzophenone; esters of aromatic acids, e. g. alkyl benzoates. Similar addition compounds are also formed from those aliphatic ketones which have two tertiary alkyl groups adjacent to the carbonyl group for example, ditertiary butyl ketone or aromatic alkyl ketones which have a tertiary carbon atom adjacent to the carbonyl group. Various derivatives of the above named compounds, e. g. their alkyl derivatives, react in the same manner. The above named compounds, when dissolved in the proper solvent, react with sodium or other alkali metal without evolution of hydrogen to produce the above described alkali metal addition compounds which are suitable for practicing our invention.

The solvents in which these alkali metal addition compounds are made appear to play an important role in the formation of the reactive solutions which we utilize as reducing agents in the present invention, for the addition compounds ordinarily do not exist except in the presence of the solvents in which they are formed. For example, if the green solution of the sodium addition compound of naphthalene is evaporated to completely remove the solvent, the residual material is a mixture of sodium and naphthalene which does not have the chemical properties of the green solution. Further, the solvent used effects the rate of reaction between the alkali metal and the organic compound. For example, in diethyl ether there is little or no reaction between sodium and the polycyclic aromatic hydrocarbons, but in the presence of certain other ether solvents hereinafter termed "active solvents" sodium readily reacts to form the addition compounds of these hydrocarbons. The active solvents preferably utilized for making these addition compounds are ether solvents. For making the sodium addition compounds of the polycyclic aromatic hydrocarbons, we prefer to use certain ethers as solvents, as described in U. S. patents to N. D. Scott, Nos. 2,019,832, 2,023,793, 2,027,000 and 2,054,303. These ether solvents include poly ethers both cyclic and non-cyclic and mono ethers which contain the $CH_3O$ group and in which the ratio of the number of oxygen atoms to the number of carbon atoms is not less than 1:4. Examples of such ethers are dimethyl ethers, methylethyl ethers and various dialkyl ethers of ethylene glycol such as dimethyl glycol ether, diethyl glycol ether, methylethyl glycol ether and the like, and various trialkyl ethers of glycerol, e. g. trimethyl glycerol ethers, and others. The sodium also may be reacted with the aromatic polycyclic hydrocarbons by utilizing as active solvent certain tertiary amines and amino ethers which are disclosed and claimed in copending applications Serial Numbers 64,172 by J. F. Walker and 64,173 by N. D. Scott, which are now Patents 2,108,277 and 2,119,493, respectively. The active dialkyl amino ethers suitable for this purpose include dialkyl amino derivatives of the ethers described in the above mentioned Scott patents, and others. Examples of such are:

$(CH_3)_2N\text{—}CH_2\text{—}O\text{—}CH_3$ (dimethylamino dimethyl ether)

$(CH_3)_2N\text{—}C_2H_4\text{—}O\text{—}CH_3$ (dimethylaminoethyl methyl ether)

$(C_2H_5)_2N\text{—}C_2H_4\text{—}O\text{—}CH_3$ (diethylaminoethyl methyl ether)

$(CH_3)_2N\text{—}C_2H_4\text{—}O\text{—}C_2H_4\text{—}O\text{—}C_2H_5$ (dimethylaminoethyl ethyl ether of ethyleneglycol)

$(CH_3)_2N\text{—}C_2H_4\text{—}O\text{—}C_2H_4\text{—}O\text{—}C_2H_4\text{—}N(CH_3)_2$ (dimethylaminoethyl diether of ethylene glycol)

$HC\equiv(O\text{—}CH_2\text{—}N(CH_3)_2)_3$ (tri (dimethylaminomethyl) ester of orthoformic acid)

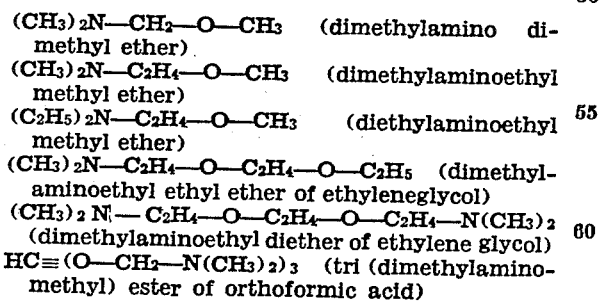

(diethylamino dioxan)

Tertiary amines which may be used as active solvents for this purpose are: trimethylamine, dimethylethylamine and tetramethyl methylene diamine.

As stated above, the special "active" solvents mentioned in the preceding paragraph are excellent for reacting sodium with polycyclic aromatic hydrocarbons. However, it is possible to react sodium with other compounds to produce the addition compounds utilized in the present invention without using the particular ethers or amines specified above as solvents. For example, diethyl ether may be used as a solvent to react sodium with benzophenone to make the disodium addition compound of that ketone. Similarly lithium may be reacted with naphthalene and other compounds to make the addition compound of lithium, using diethyl ether as the solvent. However, such reactions in diethyl ether usually are relatively slow as compared with reactions occurring in the active solvents described in the preceding paragraph. Hence, we ordinarily prefer to use such active solvents in practicing the present invention.

The solvents used to make the reactive reducing solution of the alkali metal addition compounds do not appear to affect the course of the reaction between the alkali metal compound and the metal compound, whereby the powdered metal product is formed. So far as we can ascertain, the reduction reaction which is utilized in the present invention will occur with any of the reactive solutions of the alkali metal addition compounds. For example, a solution of the sodium-naphthalene addition compound will react with a metal halide, e. g., nickel chloride, always with substantially the same results, regardless of what solvent is used to make the solution of the sodium-naphthalene addition compound.

In one method of producing metal powder in accordance with the present invention, we may first prepare a solution of the alkali metal addition compound. For this purpose we ordinarily prefer to react sodium with naphthalene or with benzophenone. As an example of the process, naphthalene may be dissolved in a quantity of dimethyl glycol ether under an atmosphere of dry, pure nitrogen. Care is taken that the naphthalene and solvent are substantially anhydrous. The required quantity of sodium in small pieces is added to the solution with agitation, whereupon the reaction begins, causing the formation of a greenish color throughout the solution. When the reaction has been completed we may then add to the resulting green solution the metal compound which it is desired to reduce, for example, nickel chloride. The metal compound may be added as a suspension or solution in a non-aqueous liquid or the solid metal compound may be added directly. When the solid metal compound is added, it is preferable to have it in a finely divided state, e. g., 50–100 mesh size, in order that the reaction may not be unduly prolonged. Preferably the mixture is stirred as the reduction reaction proceeds. The reaction is slightly exothermic and somewhat vigorous. The nickel chloride is substantially quantitatively reduced to finely divided nickel according to the following equation:

$$C_{10}H_8Na_2 + NiCl_2 \rightarrow C_{10}H_8 + 2NaCl + Ni$$

The resulting finely divided nickel appears as a black suspension in the liquid and is accompanied by a suspension of the precipitated salt. To recover the product the solution is first filtered, washed with fresh solvent such as dimethyl glycol ether to wash out the naphthalene and finally, after drying to remove the organic solvent, it may be washed with water, liquid ammonia or other suitable solvent to remove the sodium chloride. The product either before or after removal of the accompanying sodium chloride is highly pyrophoric and care must be taken 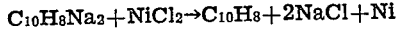 to avoid undue exposure to the air, to prevent spontaneous combustion of the finely divided metal. If desired, the pyrophoric metal may be rendered stable to the action of the air, that is, less pyrophoric, by the known method of allowing air to come into contact with the product slowly so that it gradually undergoes a slow, superficial oxidation. In carrying out this slow oxidation, we prefer to control the rate of oxidation so that the nickel does not become heated above about 25° C., since if higher temperatures are reached, the catalytic activity of the nickel powder will be impaired. In this manner the metal may be rendered substantially non-pyrophoric or less pyrophoric, which permits it to be handled in the air.

Our preferred method for making the finely divided metal consists in adding the metal compound to be reduced to the solution of the organic compound, e. g., naphthalene and adding sodium or other alkali metal to the resulting mixture. In this method the solvent must be one in which the alkali metal addition compound will be formed. We have found, for example, that when sodium is added to a suspension of nickel chloride in a solution of naphthalene in a suitable solvent such as dimethyl glycol ether, the sodium readily reacts with the naphthalene to form the green addition compound and the latter reacts almost as fast as it is formed with the nickel chloride to produce the nickel powder. In practicing the invention in this manner, we have further found that it is not necessary to have a large amount of naphthalene in the solution. For example, in certain trials we found that when the naphthalene was present in an amount equal to 3 to 20% of that theoretically required to react with the sodium utilized in the reaction, the reaction proceeded without difficulty and at a rapid rate. However, it is essential that a minimum concentration of naphthalene be present in the reaction mixture in order for the reaction to proceed at the desired rapid rate. When the naphthalene was omitted entirely, we observed no appreciable reaction of the sodium after one hour of vigorous stirring at room temperature. On the other hand, when there is sufficient naphthalene in the reaction mixture, substantially all of the sodium rapidly reacts at temperatures as low as 10° C. to form the naphthalene addition compound, which in turn rapidly reacts with the nickel chloride.

Referring to the equation given above for the reaction between nickel chloride and the sodium-napthalene addition compound, it is seen that the naphthalene is regenerated. Thus, when a metal salt, MX, is reduced by our process, the cycle of reaction may be represented:

(1) $$C_{10}H_8 + 2Na \rightarrow C_{10}H_8Na_2$$

(2) $$C_{10}H_8Na_2 + 2MX \rightarrow 2M + 2NaX + C_{10}H_8$$

The net result of the two reactions is:

(3) $$2Na + 2MX \rightarrow 2M + 2NaX$$

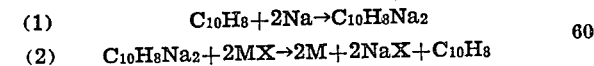
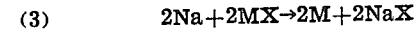

Hence, the naphthalene appears to act as a carrier for the alkali metal, by forming the highly reactive solution of the alkali metal compound. To cause reaction (2) to proceed at the rapid rate desired for efficient operation, it is essential that the total concentration of naphthalene, both free and combined, be not less than about 0.1 gram per liter, when sodium is the alkali metal and dimethyl glycol ether the solvent; preferably, the naphthalene concentration should be not less than about 0.3 gram per liter. This minimum concentration will vary somewhat from the above figures for different combinations of solvent, alkali metal and the organic compound with which the alkali metal forms the addition compound; in general, satisfactory results are obtained when the concentration of the said organic compound is at least about 0.3 gram per liter.

We have utilized this method to produce a variety of metals in finely divided form including chromium, cobalt, iron, nickel, copper, silver, lead, manganese, tin, titanium, vanadium, molybdenum, cadmium, zinc, aluminum and magnesium. We have isolated these metals from the solution in substantially pure state, with the exception of aluminum and magnesium. These last two metals appeared to be formed in the reaction mixture in the finely divided state in the same manner as the others but were more difficult to separate from the solution and accompanying alkali metal compounds, because of their extremely reactive nature. The less easily oxidized metals such as cobalt, nickel, copper, lead, silver and tin may be readily isolated in the pure state with little difficulty. The more easily oxidized metals such as zinc, magnesium, vanadium and iron were more difficult to isolate in the pure state and special care must be taken to avoid exposing them to air or moisture because of their highly pyrophoric and reactive nature.

Metal alloy powders also may be made by our herein described method by simultaneously reacting a plurality of salts of different metals with the solution of alkali metal addition compound. The alloy powders thus produced exhibit properties different from those of mixtures of the metal powders made separately and, hence, appear to be true alloys. For example, a copper powder prepared by our method was a somewhat pyrophoric, brown powder. A tin powder made by our method was a grey powder, only slightly pyrophoric. A bronze powder made by reacting a mixture of the copper salt and a small amount of the tin salt with the sodium addition compound solution, using the same reagents and conditions used for making the tin and copper powders separately, was a highly pyrophoric, black powder.

Our method also may be used to make powders which are alloys of alkali metals and various heavier metals by reacting an excess of the alkali metal addition compound solution with the salt of the heavy metal. For example, by reacting a lead salt with an excess of the sodium-naphthalene addition compound solution, we have preppared a highly reactive lead-sodium alloy powder. Similarly, a mercury salt reacts with an excess of the addition compound to produce an amalgam.

A further adaptation and use of our invention is to reactivate spent or "poisoned" metal catalysts. For example, we have found that powdered nickel catalysts which have been "poisoned" by contact with sulfur or sulfur compounds or otherwise rendered inactive through use, may be reactivated by treatment with a solution of one of the herein described alkali metal addition compounds. For example, a sample of a sulfur-poisoned, non-pyrophoric nickel powder which had poor catalytic activity was treated with a solution of the sodium addition compound of naphthalene. After separating the nickel catalyst in the usual manner, the product was a pyrophoric nickel catalyst of high catalytic activity. This reactivated catalyst hydrogenated phenol nearly twice as rapidly as did the untreated material. Similarly we have found that non-pyrophoric metal powders which have been rendered stable to pyrophoric action by partial oxidation may be converted to the pyrophoric form by reaction with the herein described solutions of alkali metal addition compounds.

While various metal compounds may be reduced in accordance with our invention, we prefer to use halides of the metals. However, other salts both organic and inorganic may be utilized in these reduction reactions, for example, we have prepared the pyrophoric metal powders according to our method by reducing the sulfates and cyanides. Oxides of the metals also may be reduced but usually the results obtained are much poorer than when the salts are used. However, this depends also to some extent upon the metal used, for example, we have found that lead oxide (PbO) and cuprous oxide are readily reduced to the metal by our method, while on the other hand, the reaction of zinc oxide is exceedingly slow. Further, when reacting a salt of a metal which has more than one valence, it is preferable to use the salt of the lowest valence. For example, stannous chloride reacted more satisfactorily than did stannic chloride.

As indicated above, the products obtained by our invention are metal powders in extremely fine states of sub-division, the particle size averaging around one micron in diameter and the maximum particle size being about four microns in diameter. These metal powders are invariably extremely reactive in their nature, and usually are pyrophoric. Further, the chemical reactivity of these powders appears to be greater than expected from consideration of the particle size and, the individual particles have a rough, porous structure. They are excellently well adapted as catalysts and for carrying out chemical reactions, for example, use as reducing agents. When properly stabilized to reduce their pyrophoric nature they also may be used as pigments in paints, varnishes, inks and other compositions. Various other uses of these novel products will be apparent to those acquainted with the various uses of finely divided metals.

It is not always necessary to separate the alkali metal salt by-product from the precipitated metal powder. For a variety of uses, the mixture of metal powder and co-precipitated alkali metal salt which is separated from the reaction mixture is usable without further treatment, except to remove the organic materials. Further, if desired, it is feasible to use the reaction mixture containing the metal powder and salt in suspension for various purposes. For example, such suspension may be added to reaction mixtures to act as a catalyst, e. g., in the use of nickel powder as hydrogenation catalyst.

An advantage of our method is that the reduction reaction occurs at low temperature, e. g., room temperature or lower. Both the reaction to form the alkali metal addition compound and the subsequent reduction reaction are preferably operated at low temperatures, e. g., 10–30° C. A further advantage is the rapidity of the reaction which permits the manufacture of the material in a relatively short time. Also, the extremely finely divided condition of the products and the porous nature of the particles makes them of superior quality for a variety of uses. For example, the rough, porous nature of the individual particles is of advantage in preparing solid articles by pressure-molding our metal powders.

The particles of this type adhere to each other more readily and consequently result in pressure-molded articles of greater strength for a given molding pressure.

We claim:

1. The process for reducing a metal compound other than an alkali metal compound which comprises reacting said compound with a solution of the alkali metal addition compound of an organic compound.

2. The process for reducing a metal salt other than an alkali metal salt which comprises reacting said salt with a solution of the alkali metal addition compound of an organic compound and thereafter separating precipitated metal from the reaction mixture.

3. The process for reducing a metal halide other than an alkali metal halide which comprises reacting said halide with a solution of the alkali metal addition compound of an organic compound selected from the group consisting of polycyclic aromatic hydrocarbons, diaryl ketones, anthraquinone, esters of aromatic acids, aryl alkyl ketones having a tertiary carbon atom adjacent to the carbonyl group, dialkyl ketones having two tertiary carbon atoms adjacent to the carbonyl group and alkyl derivatives of these compounds.

4. The process for reducing a nickel salt which comprises reacting said salt with a solution of the sodium addition compound of an organic compound selected from the group consisting of polycyclic aromatic hydrocarbons, diaryl ketones, anthraquinone, esters of aromatic acids, aryl alkyl ketones having a tertiary carbon atom adjacent to the carbonyl group, dialkyl ketones having two tertiary carbon atoms adjacent to the carbonyl group and alkyl derivatives of these compounds.

5. The process for reducing a nickel salt which comprises reacting said salt with a solution of the sodium addition compound of naphthalene and thereafter separating precipitated metal from the reaction mixture.

6. The process for reducing a nickel salt which comprises reacting said salt with a solution of the sodium addition compound of benzophenone and thereafter filtering the reaction mixture to separate a mixed precipitate of finely divided metal and alkali metal salt, washing said precipitate with organic solvent to remove organic materials therefrom and finally separating finely divided metal from said mixed precipitate.

7. The process for reducing a cobalt salt which comprises reacting said salt with a solution of the sodium addition compound of an organic compound selected from the group consisting of polycyclic aromatic hydrocarbons, diaryl ketones, anthraquinone, esters of aromatic acids, aryl alkyl ketones having a tertiary carbon atom adjacent to the carbonyl group, dialkyl ketones having two tertiary carbon atoms adjacent to the carbonyl group and alkyl derivatives of these compounds.

8. The process for reducing a nickel halide which comprises reacting said halide with a solution of the sodium addition compound of naphthalene and thereafter filtering the reaction mixture to separate a mixed precipitate of finely divided metal and alkali metal salt, washing said precipitate with organic solvent to remove organic materials therefrom and finally washing said precipitate with water to remove alkali metal salt therefrom.

9. The process for preparing an alloy powder which comprises simultaneously reacting a solution of the alkali metal addition compound of an organic compound with the compounds of a plurality of metals.

10. The process for preparing an alloy powder which comprises simultaneously reacting a solution of the sodium addition compound of a polycyclic aromatic hydrocarbon with the salts of a plurality of metals.

11. The process for preparing an alkali metal alloy of a heavier metal which comprises reacting a compound of said heavier metal with a solution of the alkali metal addition compound of an organic compound.

12. The process for preparing a sodium alloy of a heavier metal which comprises reacting a solution of the sodium addition compound of naphthalene with a salt of said heavier metal.

13. The process for preparing a lead-sodium alloy which comprises reacting a lead salt with a solution of the sodium addition compound selected from the group consisting of polycyclic aromatic hydrocarbons, diaryl ketones, anthraquinone, esters of aromatic acids, aryl alkyl ketones having a tertiary carbon atom adjacent to the carbonyl group, dialkyl ketones having two tertiary carbon atoms adjacent to the carbonyl group and alkyl derivatives of these compounds.

14. The process for preparing a lead-sodium alloy which comprises reacting a lead salt with a solution of the sodium addition compound of a polycyclic aromatic hydrocarbon.

NORMAN D. SCOTT.
JOSEPH FREDERIC WALKER.